United States Patent
De Boer et al.

(10) Patent No.: US 10,587,540 B2
(45) Date of Patent: Mar. 10, 2020

(54) GROUP MESSAGING

(71) Applicant: MARKPORT LIMITED, Dublin (IE)

(72) Inventors: Doede De Boer, Huizen (NL); Marijn Kuijpers, Ijsselstein (NL)

(73) Assignee: Markport Limited, Dublin (IE)

( * ) Notice: Subject to any disclaimer, the term of this patent is extended or adjusted under 35 U.S.C. 154(b) by 312 days.

(21) Appl. No.: 15/712,854

(22) Filed: Sep. 22, 2017

(65) Prior Publication Data
US 2018/0013701 A1 Jan. 11, 2018

Related U.S. Application Data

(63) Continuation of application No. PCT/IB2016/000407, filed on Mar. 22, 2016.

(30) Foreign Application Priority Data

Mar. 23, 2015 (EP) ..................................... 15160298
Mar. 23, 2015 (EP) ..................................... 15160301

(51) Int. Cl.
*G06F 15/16* (2006.01)
*H04L 12/58* (2006.01)
*H04L 29/08* (2006.01)

(52) U.S. Cl.
CPC ............ *H04L 51/04* (2013.01); *H04L 51/066* (2013.01); *H04L 67/24* (2013.01); *H04L 51/38* (2013.01)

(58) Field of Classification Search
CPC ................................. H04L 51/04; H04L 67/24
USPC ......................................................... 709/206
See application file for complete search history.

(56) References Cited

U.S. PATENT DOCUMENTS

| | | | |
|---|---|---|---|
| 7,386,009 B2* | 6/2008 | Reddy | H04L 29/06 370/401 |
| 9,130,779 B2* | 9/2015 | Goyal | H04L 51/34 |
| 9,473,912 B2* | 10/2016 | Circosta | H04W 88/182 |

(Continued)

FOREIGN PATENT DOCUMENTS

EP 1331786 A1 7/2003

OTHER PUBLICATIONS

Wong, Jessica. "GroupMe Makes It Incredibly Simple to SMS Your Group of Friends". Apr. 10, 2012. MakeUseOf. pp. 1-6. (Year: 2012).*

(Continued)

*Primary Examiner* — Imad Hussain
(74) *Attorney, Agent, or Firm* — Ohlandt, Greeley, Ruggiero & Perle, L.L.P.

(57) ABSTRACT

A messaging server improves interworking of the Group-chat feature (such as defined in Rich Communications Services (RCS)) with short message services such as SMS. It matches chat invitations in an effective manner. When an RCS-User invites an SMS-User to an RCS Group-chat session, the identification of the RCS-User in the Group-chat to the SMS-User is via the MSISDN of the RCS-User. Using the MSISDN of the RCS-User in the RCS Group-chat invitation to the SMS-User will provide a direct match with the RCS-User MSISDN in the address-book of the SMS-User and therefore provide immediate clarity from who this Group-chat invitation was received. The SMS-User can accept or reject the Group-chat invitation by returning the proper response as requested in the invitation.

19 Claims, 6 Drawing Sheets

(56) References Cited

U.S. PATENT DOCUMENTS

| | | | | |
|---|---|---|---|---|
| 2002/0173319 A1* | 11/2002 | Fostick | .............. | H04W 88/184 455/466 |
| 2003/0133421 A1* | 7/2003 | Sundar | .................. | H04W 4/00 370/328 |
| 2004/0039782 A1* | 2/2004 | Reddy | .................. | H04L 29/06 709/205 |
| 2006/0067502 A1* | 3/2006 | Bamrah | ............... | H04L 12/189 379/211.02 |
| 2008/0019353 A1* | 1/2008 | Foote | ................ | H04L 12/1822 370/352 |
| 2010/0057754 A1* | 3/2010 | Moudy | ............... | G06Q 20/382 707/E17.044 |
| 2010/0304766 A1* | 12/2010 | Goyal | .................. | H04L 51/34 455/466 |
| 2010/0317376 A1* | 12/2010 | Anisimov | .............. | H04L 51/38 455/466 |
| 2011/0289011 A1* | 11/2011 | Hull | .................... | G06Q 10/107 705/319 |
| 2013/0046828 A1* | 2/2013 | Grewal | ................. | G06Q 10/10 709/204 |
| 2013/0282838 A1* | 10/2013 | Zhu | ........................ | H04L 51/12 709/206 |
| 2013/0301529 A1* | 11/2013 | Lindsay | ................. | H04W 4/12 370/328 |
| 2014/0134978 A1* | 5/2014 | Zitnik | .................... | H04L 69/08 455/411 |
| 2015/0256497 A1* | 9/2015 | Park | ....................... | H04W 4/14 709/206 |
| 2015/0373200 A1* | 12/2015 | Zitnik | .................... | H04L 51/38 370/260 |
| 2016/0212230 A1* | 7/2016 | Schneider | ............... | H04L 67/22 |
| 2017/0034676 A1* | 2/2017 | Circosta | ............. | H04W 88/182 |

OTHER PUBLICATIONS

Tedeschi, Bob. "Group Texting Apps Have Benefits for Adults". Oct. 21, 2010. New York Times. pp. 1-6. (Year: 2010).*

VanHemert, Kyle. "Lifechanger: GroupMe Group Texting". Jan. 10, 2011. Gizmodo. pp. 1-4. (Year: 2011).*

International Search Report dated Aug. 26, 2016 from corresponding PCT/IB2016/000407, pp. 6.

International Written Opinion dated Aug. 26, 2016 from corresponding PCT/IB2016/000407, pp. 8.

International second Written Opinion dated Sep. 12, 2017 from corresponding PCT/IB2016/000407, pp. 8.

"3rd Generation Partnership Project;Technical Specification Group Services and System Aspects;IP-Short-Message-Gateway (IP-SM-GW) enhancements for interworking with OMA CPM(Release 10)", 3GPP Draft; 23824-110_CHANGE-MARKS, 3rd Generation Partnership Project (3GPP), Mobile Competence Centre ; 650, Route Des Lucioles ; F-06921 Sophia-Antipolis Cedex; France, val. SA WG2, No. Shenzhen; Jan. 18, 2010, Jan. 22, 2010 (Jan. 22, 2010), XP050433258, [retrieved on Jan. 22, 2010], pp. 22.

* cited by examiner

GROUP MESSAGING

BACKGROUND OF THE DISCLOSURE

The present disclosure relates to group messaging, commonly referred to as "Group-chat".

How group chat users such as RCS (Rich Communication Services) group users should interwork with SMS (Shore Message Service) users is not standardized. Group-chat on SMS has serious limitations because of the existing phone and network technology where MSISDNs (Mobile Station International Subscriber Directory Number (telephone number)) are used to identify individual users. RCS Group chat invitations cannot be matched with address-book entries and RCS Group chat attendees are identified with MSISDN in Group chat invitation.

When a Group-chat invitation has no match with an address-book entry, when introducing Group-chat in the SMS-domain, a special MSISDN (which is not the MSISDN of the originator of the Group-chat) is used to identify/anchor the Group session. The SMS that contains the Group-chat invitation does not match with an entry in the device address-book and therefore is likely to be ignored by the recipient of the Group-chat invitation.

Regarding Group-chat attendees being identified with MSISDN, the generic implementation of Group-chat in SMS is that the MSISDN of a user is included in the message payload to identify the user that sent a message. This provides a poor user experience since the recipient of the Group-chat message will not be able to relate a received message with a person using the MSISDN.

The present disclosure addresses these problems.

SUMMARY OF THE DISCLOSURE

According to the present disclosure, there is provided a method of an inviting device inviting a user device to participate in a group chat session when the invited device does not have group chat capability, the method comprising the step of a messaging server sending a group chat server invite message to said invited device, the invite message including the MSISDN (telephone number) of the inviting user device.

Preferably, a display name of the inviting device user is included in the server invite message Preferably, the messaging server automatically discovers that said invited device does not have said group chat capability, after receiving a device invite message sent by the inviting device.

In one embodiment, the messaging server creates the invite message as an SMS message with attributes including the inviting device MSISDN. In one embodiment, said attributes include an MSISDN of the invited device and a payload with a group chat invitation from a named inviting user. In one embodiment, the payload attributes include names of other participants.

In one embodiment, the payload attributes include a message informing the invited user of how to respond to options to accept or decline. Preferably, the options are short alphanumeric character strings in a response SMS message. In one embodiment, the payload includes an invitation to provide the invited user's name in a response to the invite message.

In one embodiment, the messaging server maintains a state that indicates it has sent the server invite message. In one embodiment, the messaging server parses a response from the invited device. In one embodiment, the response is a decline the messaging server does not send any more messages related to the group chat session.

In one embodiment, if there is no response the messaging server expires the invitation after a period of time.

In one embodiment, in order to route a response from the invited device back to the messaging server an SMS home-routing element in the network of the messaging server identifies the response as an acknowledgement of the server invite message and routes the response back to the messaging server.

In one embodiment, the response is routed back to the messaging server and matched with the server invite message, the messaging server sends a notification to all devices in the group chat session informing that the invited user has entered the session. In one embodiment, the notification contains both the MSISDN from the invited user and an invited user display name.

In one embodiment, the messaging server reserves a telephone number as originator address for all subsequent SMS messages from the session to the invited user and vice versa.

In one embodiment, the messaging server sends a notification to the invited device informing the invited user that he or she has joined the group chat session.

Preferably, the messaging server sends address data to the invited device in order to create an entry in the address-book of the invited device.

In another aspect, the present disclosure provides a messaging server comprising a processor and an interface to a mobile network, wherein the processor is configured to perform messaging server steps of a method as defined above in any embodiment.

In a further aspect, the present disclosure provides a computer readable medium comprising non-transitory software code for implementing the messaging server steps of a method as defined above in any embodiment when executed by a digital processor.

BRIEF DESCRIPTION OF THE DRAWINGS

The present disclosure will be more clearly understood from the following description of some embodiments thereof, given by way of example only with reference to the accompanying drawings in which.

DESCRIPTION OF THE DISCLOSURE

Figure 1:
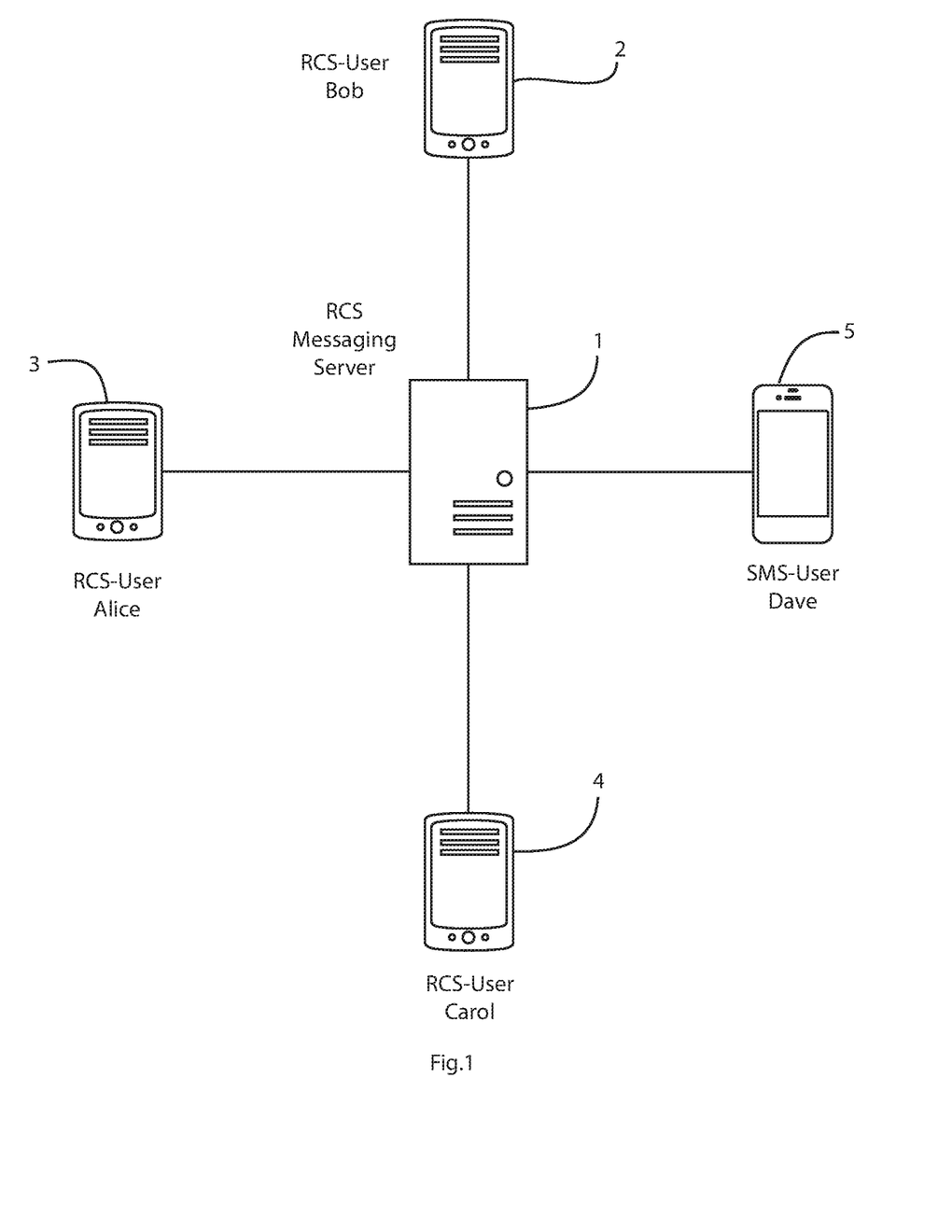
FIG. 1 is a block diagram showing four user devices linked with a messaging server of the present disclosure.

Referring to FIG. 1, a messaging server 1 is linked with RCS devices 2, 3, and 4, and an SMS device 5. Bob, Alice and Carol are RCS-Users and participate in an RCS Group-chat.

Before describing the present disclosure in detail the following is a simple use case to illustrate how it operates.

Bob invites SMS-User Dave to join the RCS Group-chat. Bob, Alice and Carol all configured their First Name in capitals as RCS Display-name in their RCS-client. Bob who is the owner of this RCS Group-chat wants to invite Dave to the RCS Group-chat as well. Dave however only has SMS and MMS messaging capabilities on his mobile phone and does not have RCS capabilities. Bob sees that Dave only has SMS and MMS capabilities on his phone via capability discovery.

Figure 2:
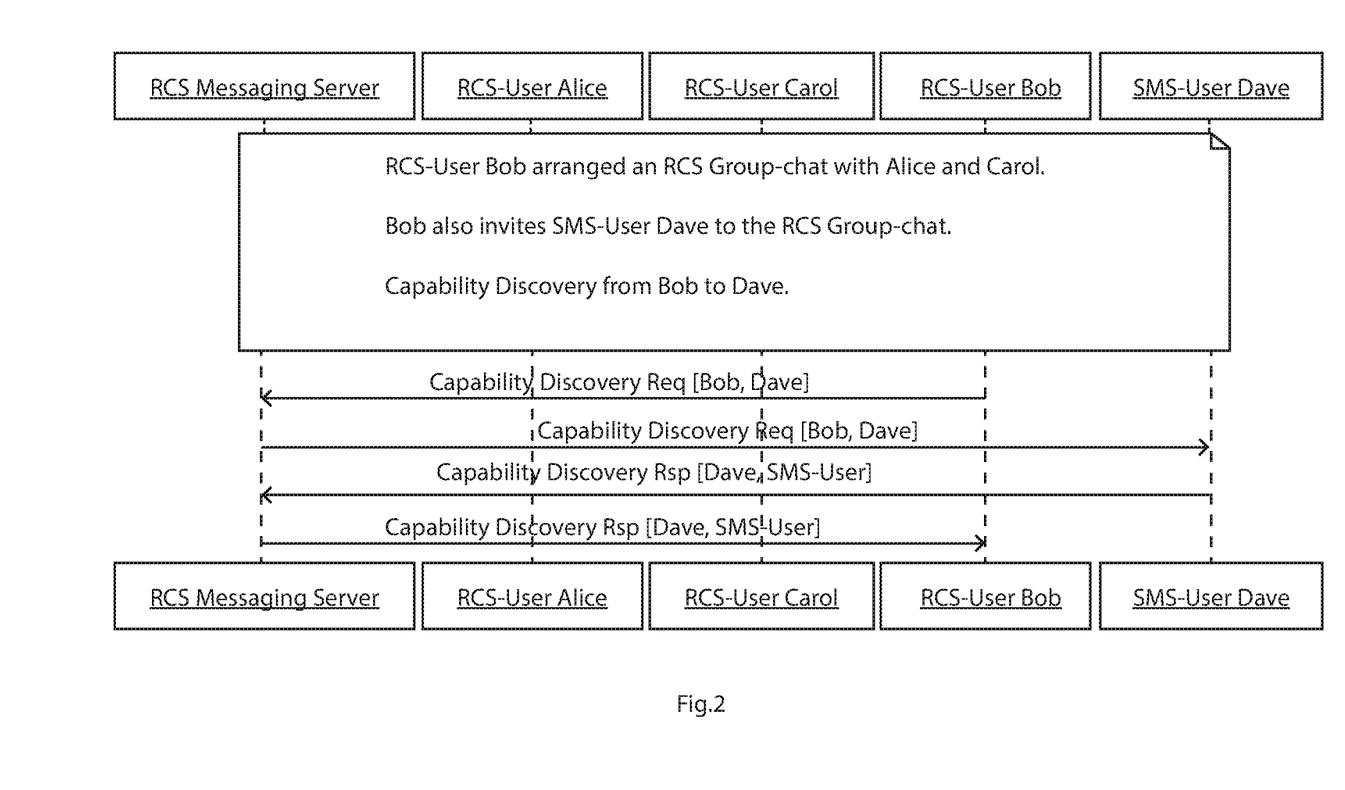
FIGS. 2 to 6 are message sequence diagrams illustrating operation of a messaging server of the present disclosure.

As shown in FIG. 2, Bob sends an invite to Dave for the Group-chat. The invite is received in the network by the RCS messaging server 1 which discovers that Dave is not an RCS-User. The RCS messaging server 1 creates an SMS with the following attributes:

<Originator MSISDN: MSISDN Bob><Terminator MSISDN: MSISDN Dave><Payload: Group-Chat invitation from BOB, other participants are ALICE and CAROL. If you want to accept the invitation return #Y, if you want to decline return #N. When you return #Y, you can optionally enter your Display-name without spaces after the #Y, separated by a *. Example: #Y#JOHN*, to exit the Group-chat send #B*. Group-Chat will continue from Telephone number: 1234567>

The RCS messaging server 1 sends this SMS to Dave. The RCS messaging server 1 will maintain state about that it has sent an RCS Group-Chat invitation from RCS-User Bob to SMS-User Dave. When Dave receives the SMS he immediately sees that he is getting an SMS from Bob (via a match in the phone address-book) and that it is a Group-Chat invitation from Bob in which also Alice and Carol participate, see text:

"Group-Chat invitation from BOB, other participants are ALICE and CAROL. If you want to accept the invitation return #Y, if you want to decline return #N. When you return #Y, you can optionally enter your Display-name without spaces after the #Y, separated by a *. Example: #Y#JOHN*, to exit the Group-chat send #B*. Group-Chat will continue from Telephone number: 1234567"

When Dave wants to decline and returns '#N*', Dave will not get any more messages related to this Group-chat. When Dave returns nothing the invitation will expire and Dave will also not receive any Group-chat messages.

Dave however accepts and returns '#Y#DAVE*'.

The SMS returned to Bob has the following attributes:
<Originator MSISDN: MSISDN Dave><Terminator MSISDN: MSISDN Bob><Payload:#Y#DAVE*>

Figure 3:
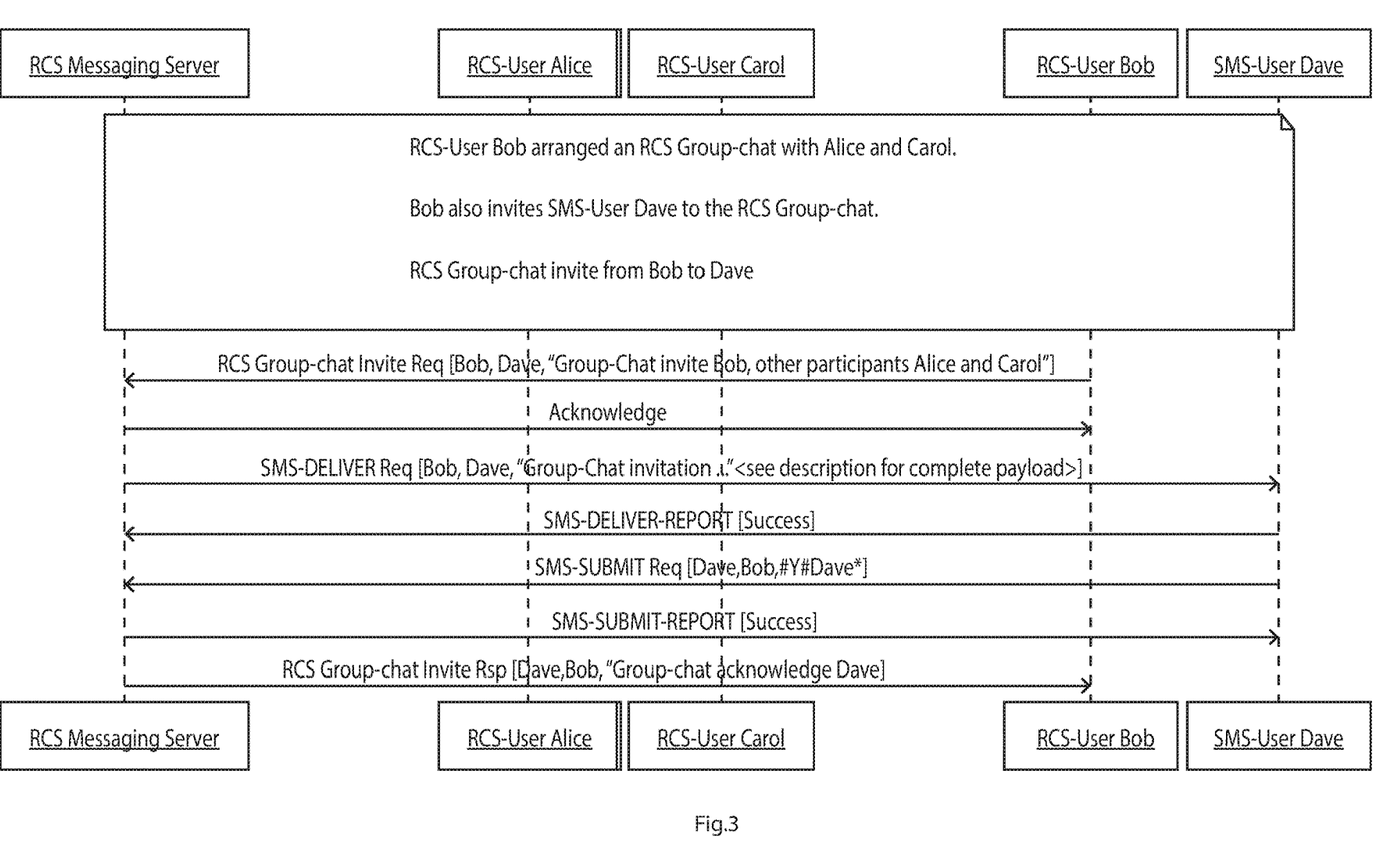
Figure 4:
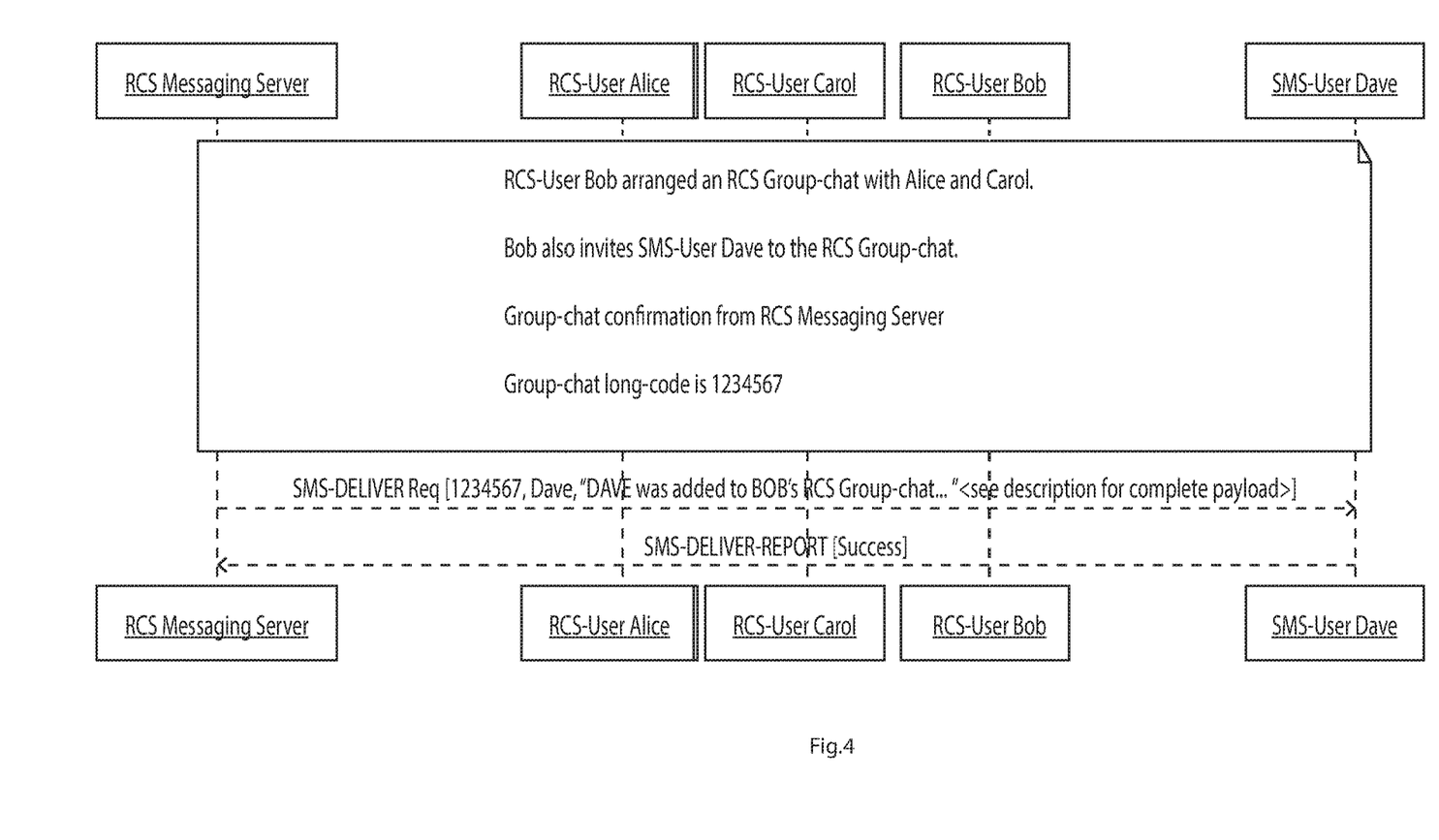

Referring to FIG. 3, in order to route the SMS from Dave back to the RCS Messaging Server 1 the SMS Home-routing feature is required in the network of the RCS Messaging Server that anchors the Group-chat. When the SMS arrives in the network of the RCS Messaging Server 1, the SMS from Dave should be identified as an acknowledgement on the RCS Group-chat invitation from Bob. So, the SMS with payload "#Y*" (=accept) or "#N*" (=decline) needs to be routed by the SMS Home-routing feature back to the RCS Messaging Server. When the SMS is routed back to the RCS messaging server 1 and matched with the Group-chat invitation request from Bob, the RCS messaging server 1 will send a notification to all RCS Users in the Group-chat indicating that Dave has entered the Group-chat. The notification will contain both the MSISDN from Dave and Dave's Display-name "DAVE" which will directly inform Bob, Alice and Carol that Dave has joined the Group-chat. In addition the RCS messaging server will reserve the telephone number: 1234567 as originator address for all subsequent SMS messages from the RCS Group-chat to Dave and vice versa. Also Dave will receive a notification from the RCS messaging server via SMS that he has joined the Group-chat of Bob.
<Originator MSISDN: 1234567><Terminator MSISDN: MSISDN Dave><Payload: DAVE was added to BOB's RCS Group-chat.>

Prior to sending the notification from the RCS messaging server 1 to Dave, the RCS messaging server 1 could send a vCard to Dave in order to create an entry in the address-book from Dave for Bob's RCS Group-chat. When the entry in the address-book of Dave for Bob's RCS Group-chat is there and the SMS with the notification about Dave entering Bob's RCS Group-chat is received by Dave, the SMS would directly be presented as a notification for Bob's RCS Group-chat.

When Bob receives the RCS Group-chat notification that Dave entered the chat, Bob returns a message to the Group saying "Welcome to the Group Dave." This message is distributed by the RCS messaging server to Alice, Carol and Dave. The RCS messaging server 1 recognizes that Dave is an SMS-User and sends an SMS with the following attributes to Dave:
<Originator MSISDN: 1234567><Terminator MSISDN: MSISDN Dave><Payload: BOB: Welcome to the Group Dave.>

Figure 5:
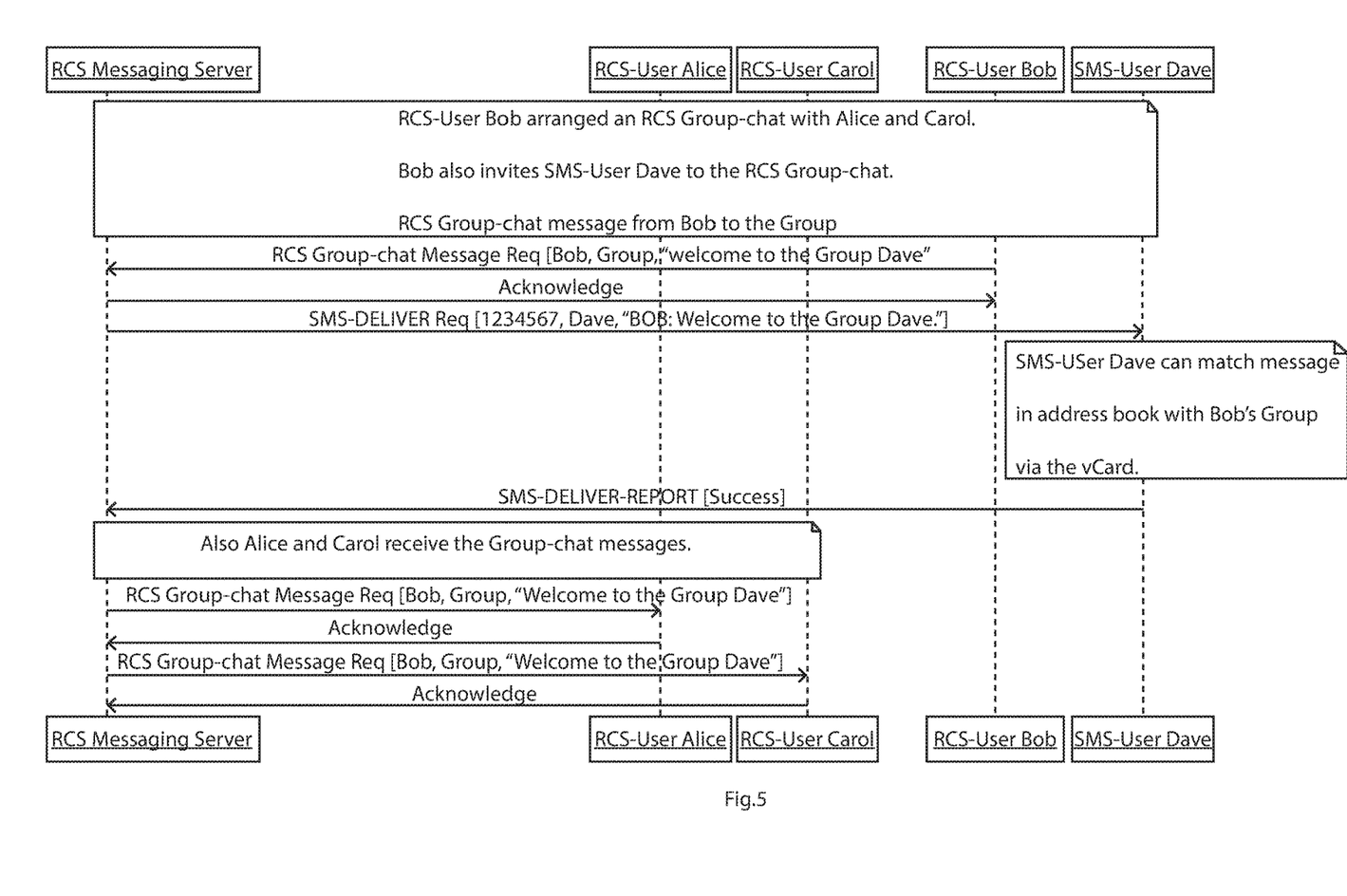

Referring to FIG. 5, Dave receives this SMS with originating address 1234567 which will end up in a conversational thread of Bob's RCS Group-chat. Dave returns an SMS message with the following attributes to Bob's RCS Group-chat:
<Originator MSISDN: MSISDN Dave><Terminator MSISDN: MSISDN 1234567><Payload: Thanks Bob.>

The RCS messaging server 1 will distribute the message from Dave to all other attendees in the Bob's RCS Group-chat with Dave's Display-name as message property.

Figure 6:
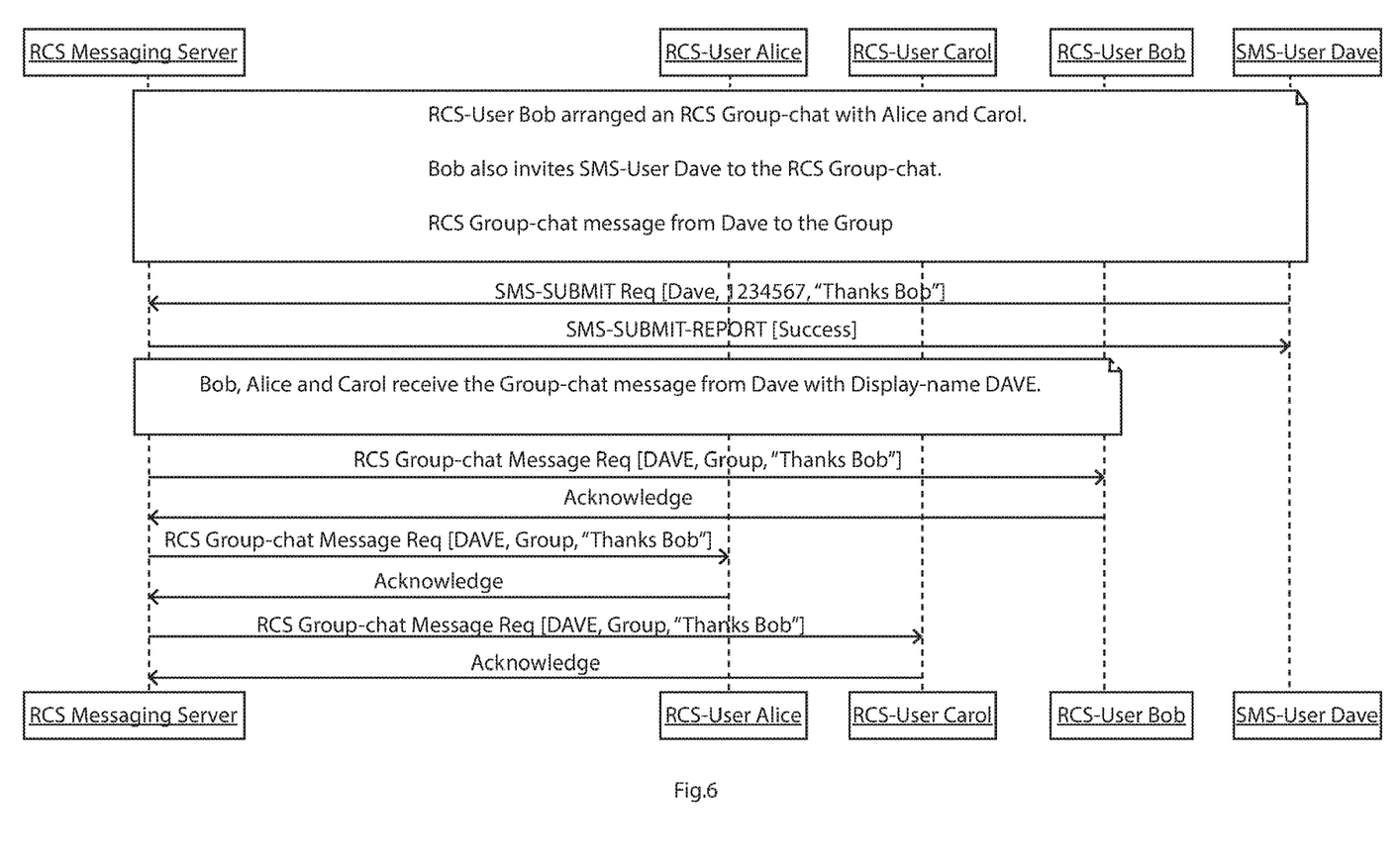

Referring to FIG. 6, Carol doesn't want to participate in the Bob's RCS Group-chat anymore and leaves the Group-chat. The RCS messaging server removes Carol from Bob's RCS Group-chat and notifies Bob, Alice and Dave that Carol has left the Group-chat.

The RCS messaging server sends an SMS with the following attributes to Dave:
<Originator MSISDN: 1234567><Terminator MSISDN: MSISDN Dave><Payload: CAROL has left BOB's RCS Group-chat. Remaining attendees are: BOB, ALICE and DAVE>

When Dave leaves Bob's Group-chat he sends an SMS with the following attributes to Bob's RCS Group-chat (Telephone number: 1234567):
<Originator MSISDN: MSISDN Dave><Terminator MSISDN: MSISDN 1234567><Payload: #B*>

The RCS Messaging Server will receive this message and will remove Dave from Bob's RCS Group-chat. In addition it will notify all the remaining attendees, Bob and Alice, that Dave has left Bob's RCS Group-chat. Also Dave will receive a notification SMS as confirmation that he left Bob's RCS Group-chat. The SMS notification has the following attributes.
<Originator MSISDN: 1234567><Terminator MSISDN: MSISDN Dave><Payload: DAVE has left BOB's RCS Group-chat. Remaining attendees are: BOB and ALICE>

It will be appreciated that the present disclosure significantly improves interworking of the Group-chat feature (such as defined in Rich Communications Services (RCS)) with the Short Message Services (SMS) achieves matching of chat invitations in an effective manner.

When an RCS-User invites an SMS-User to an RCS Group-chat session, the identification of the RCS-User in the Group-chat to the SMS-User is via the MSISDN of the RCS-User. Using the MSISDN of the RCS-User in the RCS Group-chat invitation to the SMS-User will provide a direct match with the RCS-User MSISDN in the address-book of the SMS-User and therefore provide immediate clarity from who this Group-chat invitation was received. The SMS-User can accept or reject the Group-chat invitation by returning the proper response as requested in the invitation.

Also, advantageously, when an SMS-User participates in an RCS Group-chat, the RCS Display-name of the RCS-User is used as identification towards the SMS-User instead of the MSISDN of the RCS-User. The Display-name of an RCS-User is used for every Group-chat event that is initiated by an RCS-User and notified to the SMS-User. The RCS Display-name is added to the SMS text payload.

Group-chat events are:
(a) Group-chat invitation with Group-chat attendee-list,
(b) Individual Group-chat conversation contributions
(c) Individuals joining the Group-chat
(d) Individuals leaving the Group-chat
(e) Group-chat termination by Group-chat creator/admin.

The present disclosure is not limited to the embodiments described but may be varied in construction and detail.

What is claimed is:

1. A method of an inviting device inviting a user device to participate in a Rich Communications Services (RCS) group chat session when said invited device is using one of Short Message Service (SMS) or Multimedia Messaging Service (MMS), said method comprising an operation of an RCS messaging server sending to said invited device, an SMS message, having:
   (a) a payload that contains an RCS group chat server invite message; and
   (b) an originating MSISDN field that contains an MSISDN of said inviting device;
   wherein in order to route a response from said invited device back to the RCS messaging server, an SMS home-routing element in a network of said RCS messaging server identifies said response as an acknowledgement of said RCS group chat server invite message and routes said response back to said RCS messaging server.

2. The method of claim 1, wherein said payload includes a display name of a user of said inviting device.

3. The method of claim 1, wherein said messaging server automatically discovers that said invited device does not have said group chat capability, after receiving a device invite message sent by said inviting device.

4. The method of claim 1, wherein said payload includes a group chat invitation from a named inviting user.

5. The method of claim 1, wherein said payload includes names of other participants of said group chat session.

6. The method of claim 1, wherein said payload includes a message informing an invited user of how to respond to options to accept or decline.

7. The method of claim 6, wherein said options are short alphanumeric character strings in a response SMS message.

8. The method of claim 1, wherein said payload includes an invitation to provide an invited user's name in a response to said group chat server invite message.

9. The method of claim 1, wherein said messaging server maintains a state that indicates it has sent said SMS message.

10. The method of claim 1, wherein said messaging server parses a response from said invited device.

11. The method of claim 10, wherein if said response is a decline, said messaging server does not send, to said invited device, any more messages related to said group chat session.

12. The method of claim 11, wherein if there is no response to said SMS message, said messaging server expires said invitation after a period of time.

13. The method of claim 1, wherein when said response is routed back to said messaging server and matched with said group chat server invite message, said messaging server sends a notification to all devices in said group chat session informing that an invited user has entered said group chat session.

14. The method of claim 13, wherein said notification contains an MSISDN of said invited user device, and an invited user display name.

15. The method of claim 14, wherein said messaging server reserves a telephone number as an originator address for all subsequent SMS messages from said group chat session to said invited user and vice versa.

16. The method of claim 1, wherein said messaging server sends a notification to said invited device informing said invited user that he or she has joined said group chat session.

17. The method of claim 16, wherein, prior to sending said notification, said messaging server sends to said invited device, an MSISDN for a group chat, in order to create, in an address-book of said invited device, an entry for said group chat session.

18. A messaging server comprising a processor and an interface to a mobile network, wherein said processor is configured to perform messaging server operations of the method of claim 1.

19. A computer readable medium comprising non-transitory software code for implementing messaging server operations of the method of claim 1 when executed by a digital processor.

* * * * *